Figure 1:
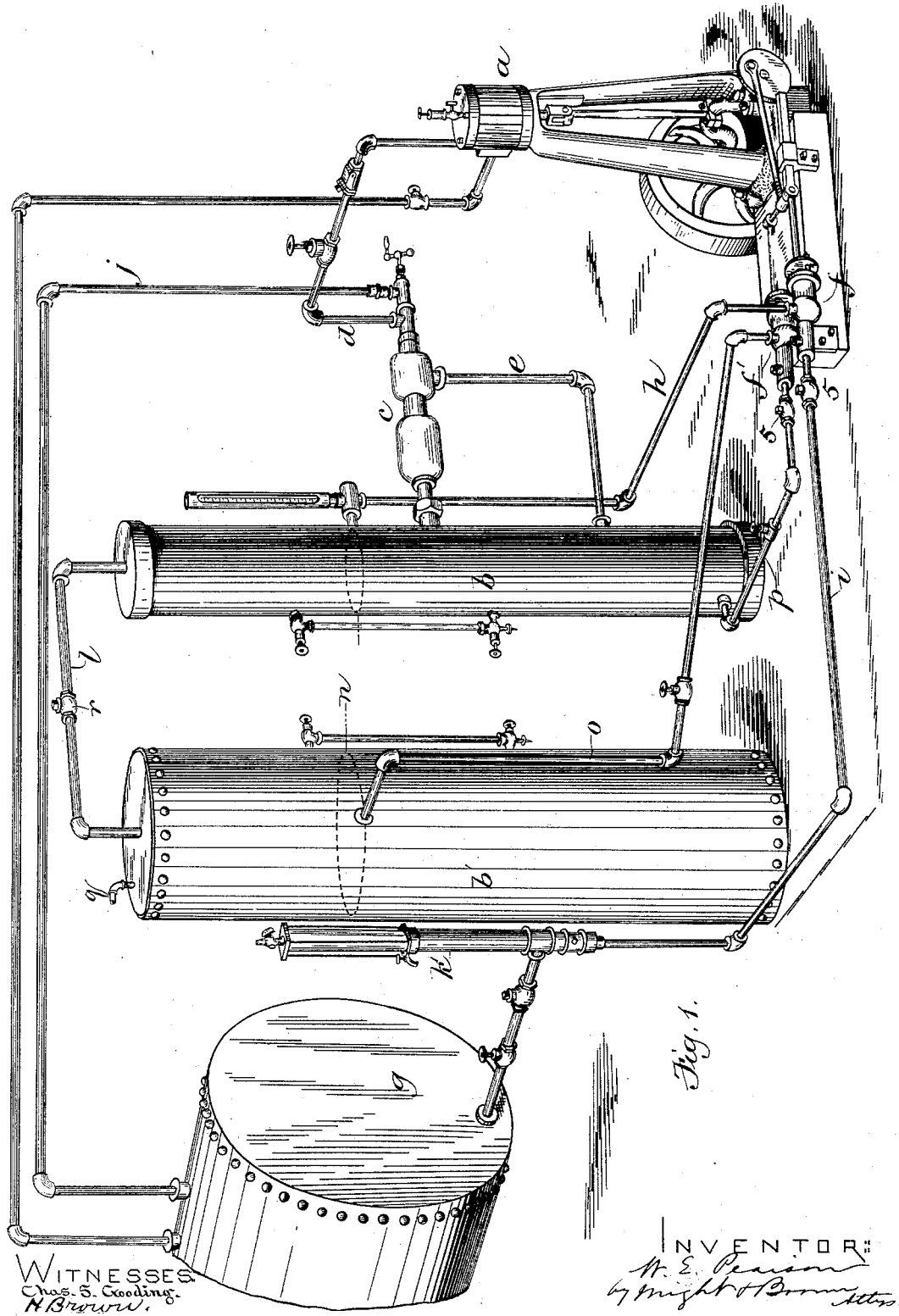

(No Model.) 2 Sheets—Sheet 1.

W. E. PEARSON.
HEATING FEED WATER.

No. 371,212. Patented Oct. 11, 1887.

WITNESSES
Chas. S. Gooding.
H. Brown.

INVENTOR:
W. E. Pearson
by Wright & Brown
Attys.

(No Model.) 2 Sheets—Sheet 2.
W. E. PEARSON.
HEATING FEED WATER.
No. 371,212. Patented Oct. 11, 1887.
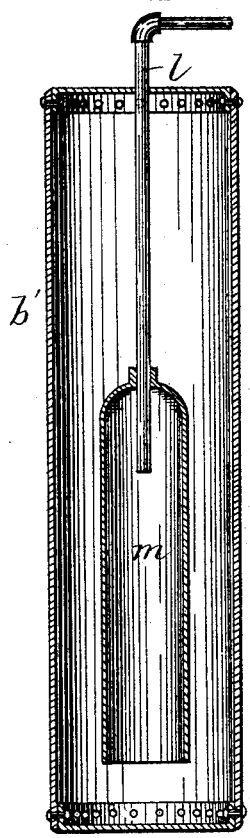
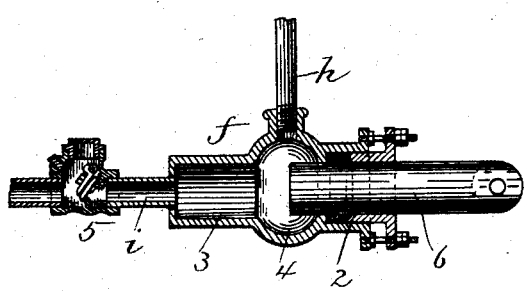

UNITED STATES PATENT OFFICE.

WILLIAM E. PEARSON, OF SAUGUS, ASSIGNOR TO NATHAN H. DANIELS, OF BOSTON, MASSACHUSETTS.

HEATING FEED-WATER.

SPECIFICATION forming part of Letters Patent No. 371,212, dated October 11, 1887.

Application filed June 12, 1885. Serial No. 168,496. (No model.)

*To all whom it may concern:*

Be it known that I, WILLIAM E. PEARSON, of Saugus, in the county of Essex and State of Massachusetts, have invented certain new and useful Apparatus for Heating Feed-Water, of which the following is a specification.

This invention relates to the apparatus for heating feed-water by exhaust-steam shown in my application for Letters Patent filed April 25, 1885, No. 163,432. In said apparatus an injector is connected with the exhaust-pipe of a steam-engine, so as to receive steam therefrom, and a feed-water tank is connected with the water inlet and discharge passages of the injector, so that the passage of the exhaust-steam through the injector will heat and circulate the water in the tank. The heated water is forced from the tank to the boiler by a feed-pump. Means are provided for relieving the tank from pressure caused by the introduction of the exhaust-steam, said application describing both a vapor-pump and a safety-valve as suitable means for relieving such pressure, the vapor-pump forcing the vapor or steam received from the tank directly to the boiler, while the safety-valve, which is described as an alternative device, would permit the discharge of the vapor or steam into the atmosphere.

My present improvement relates, in part, to the means for relieving the tank from pressure, and has for its object to enable the surplus steam or vapor from the tank to heat water in a secondary tank or heater, which is connected with the tank that communicates directly with the injector.

To this end my present invention consists in the combination, with the apparatus above referred to, of a secondary tank or heater connected to the upper part of the primary tank in which the water is circulated by the injector, so as to receive the surplus steam therefrom, the connection being such that the steam is conducted downwardly nearly to the bottom of the secondary tank, and a pump whereby the heated water in the secondary tank is forced into the primary tank.

The invention also consists in certain other constructions, all of which I will now proceed to describe and claim.

Of the accompanying drawings, forming a part of this specification, Figure 1 represents a perspective view of my improved apparatus. Fig. 2 represents a vertical section of the secondary tank or heater. Fig. 3 represents a longitudinal section of one of the feed-pumps.

The same letters of reference indicate the same parts in all the figures.

In the drawings, $a$ represents a steam engine, which may be of any kind.

$b$ represents the feed-water-heating tank.

$c$ represents the injector, the steam-inlet of which is connected by a pipe, $d$, with the steam-exhaust pipe of the engine, while its water-inlet is connected by a pipe, $e$, with the tank $b$, and its discharge-nozzle communicates with said tank at a point above the point where the pipe $e$ is connected thereto.

$f$ represents the feed-pump, which forces the heated water from the tank $b$ to the boiler $g$, said pump being connected by a pipe, $h$, with the tank $b$ above the injector, and by a pipe, $i$, with the lower portion of the boiler.

$j$ represents a pipe extending directly from the boiler to the steam-inlet of the injector $c$, for the purpose of supplying steam to operate the injector when the supply of exhaust-steam from the engine is insufficient.

The apparatus operates as follows: Steam being supplied to the injector, either directly from the boiler or from the exhaust of the engine, the water is drawn from the lower part of the tank $b$ into the injector and returned by the latter to the tank heated and augmented by the steam supplied to the injector, said steam being mainly absorbed by the water. The heated water passes from the tank at a point above the injector, and is forced by the pump $f$ to the boiler. When the engine is in operation, the direct steam through the pipe $j$ is shut off and the exhaust-steam only is supplied to the injector. The oil from the cylinder of the engine which may be forced into the feed-water by the exhaust-steam is prevented from entering the boiler by a "separator," $k$, such as is shown in my former application. In carrying out my present invention, instead of relieving the pressure created in the tank $b$ by the accumulation of steam or vapor therein by pumping such steam or vapor from the upper portion of the tank b into the boiler, as described in my former application, I provide a secondary tank, b', which is connected by a pipe, l, with the upper portion of the tank b, so as to receive steam and vapor from the latter. The pipe l is extended downwardly into the secondary tank b' and into a cylinder or compartment, m, within said tank, which compartment is closed at its upper end around the pipe l and is open at its bottom. Said secondary tank is filled with water up to the line n, where a pipe, o, is connected with the tank and conducts water therefrom to a feed-pump, f', which forces such water through a pipe, p, to the lower portion of the tank b, which I term the "primary" tank or heater. The steam or vapor which is not absorbed by the water in the primary heater passes from thence into the water in the secondary tank and is entirely absorbed by the water therein, the water being thus heated and augmented and returned to the primary heater as fast as it accumulates above the working-level of the secondary heater by the feed-pump f'. The open-bottomed compartment m within the secondary heater confines the heated water around the mouth of the pipe l until it has entirely absorbed the steam, the heated water being displaced downwardly into the main body of the tank b', in which it rises to the working-level. This construction prevents the disagreeable noise which attends the introduction of steam into a body of water. The upper end of the secondary tank is provided with a pipe, q, which is always open to the atmosphere, so that there can be no variations of pressure in said tank. When the water in the secondary tank becomes reduced by evaporation or from any cause, a supply is introduced through the pipe q or through another pipe provided for the purpose. The pipe l is provided with a check-valve, r, to prevent water from being drawn backwardly from the secondary tank in case of a vacuum in the primary tank.

The plungers of the two feed pumps f f' are preferably coupled together and operated by a connection with the crank-shaft of the engine, as shown. Each pump is composed of two cylinders, 2 3, separated by an enlargement or chamber, 4, which the pipe enters that conducts the water to the pumps, and a plunger, 6, which closely fits the cylinders.

The plunger in making its forward stroke passes from the cylinder 2, through the chamber 4, and into the cylinder 3, forcing a part of the water forward through the pipe that conducts it away. The pipes p i are provided with check-valves 5 5, which prevent backward movement of the water from said pipes into the pumps when the pistons are making their backward stroke.

It will be seen that by the described improvement all the steam is utilized in heating the feed-water, and the apparatus is materially simplified.

I do not limit myself to supplying the injector mainly with exhaust-steam, as it may be supplied wholly with direct steam from the boiler, or it may be supplied with steam that has first been used for heating or other purposes.

I claim—

1. The combination, with the primary tank or heater and the water heating and circulating injector connected with said tank, as described, of the secondary tank connected to the primary tank, so as to receive surplus steam therefrom, and a feed-pump and connections, as described, whereby water is transferred from the secondary to the primary tank, as set forth.

2. The combination, with the primary tank or heater and the water heating and circulating injector connected with said tank, as described, of the secondary tank, the pipe l, extending from the top of the primary tank to the lower portion of the secondary tank, and the open-bottomed inner receptacle, m, within the secondary tank, whereby the heated water is partially confined around the delivery end of the pipe l, as set forth.

3. The feed-pump composed of the cylinders 2 3, the chamber 4 between the cylinders, receiving the supply-pipe, the discharge-pipe having a check-valve communicating with one of the cylinders, and the plunger adapted to reciprocate in the cylinders, as set forth.

4. The combination of a steam-engine, an injector connected with the exhaust-pipe of the engine, a primary feed-water tank connected, as described, with the inlet and discharge passage of the injector, the secondary tank connected, as described, with the primary tank, so as to receive steam or vapor therefrom, and means for forcing water from the secondary to the primary tank, as set forth.

5. The combination of a steam-boiler, an engine supplied with steam by the boiler, a primary feed-water tank, an injector connected, as described, with the exhaust-pipe of the engine and with the primary tank, a secondary tank connected, as described, with the primary tank, so as to receive steam or vapor therefrom, means for forcing water from the secondary to the primary tank, and a connection, substantially as described, between the primary tank and boiler, whereby the heated feed-water is supplied to the boiler, as set forth.

In testimony whereof I have signed my name to this specification, in the presence of two subscribing witnesses, this 10th day of June, 1885.

WILLIAM E. PEARSON.

Witnesses:
C. F. BROWN,
H. BROWN.